Figure 1:
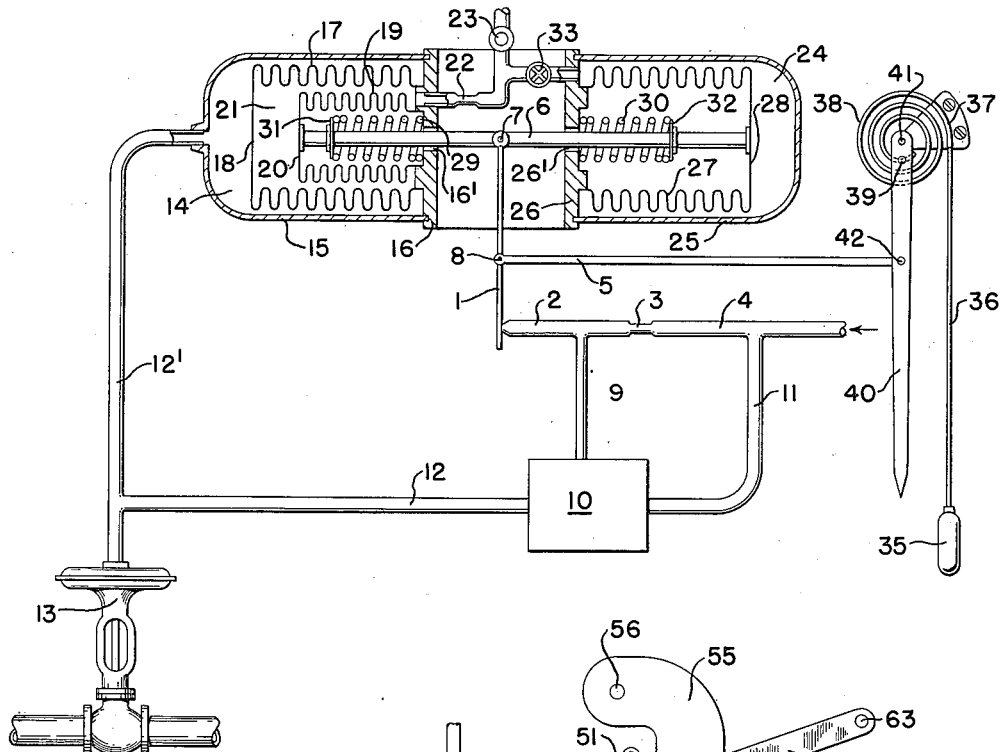

March 11, 1952  D. P. ECKMAN  2,588,621
PNEUMATIC CONTROL SYSTEM
Filed Nov. 14, 1947

INVENTOR.
DONALD P. ECKMAN
BY Arthur H. Swanson
ATTORNEY

Patented Mar. 11, 1952

2,588,621

UNITED STATES PATENT OFFICE 2,588,621

PNEUMATIC CONTROL SYSTEM

Donald P. Eckman, Ithaca, N. Y., assignor, by mesne assignments, to Minneapolis-Honeywell Regulator Company, Minneapolis, Minn., a corporation of Delaware Application November 14, 1947, Serial No. 785,989

6 Claims. (Cl. 137—153)

1

The general object of the present invention is to provide an improved air controller characterized by the novel and inherently simple and effective character of its provisions for obtaining proportional, reset and rate responses to a change in the value of the controlled variable. More specifically, the object of the invention is to provide an air controller comprising novel pneumatic means which utilize the compressibility of air in obtaining proportional, reset and rate responses.

My improved controller in its preferred form includes two air filled expansible chambers having movable walls mechanically connected so that the expansion of either chamber is attended by the contraction of the other chamber, and includes valve means given follow-up, reset and rate response adjustments by the movements of said movable walls, and is characterized by the means through which the common movements of said walls are controlled. In accordance with the present invention, each of said chambers is in restricted communication with the atmosphere, and the connected walls move in response to variations in the resultant of forces due to the air pressures in the two chambers, and due to biasing means which tend to hold said movable walls in predetermined or normal positions. One of said chambers has a second movable wall subjected to an external controlling air pressure which is varied as a result of valve adjustments effected by means responsive to variations of the controlled variable. The latter may be a temperature, a fluid pressure or other measurable quantity or condition.

The air chamber having the second movable wall may be in restricted communication with the atmosphere through a flow passage of small but constant flow capacity, but the flow capacity of the passage through which the other chamber is in restricted communication with the atmosphere is preferably adjustable, as by means of a suitable throttling valve. When the latter is adjusted to make the last mentioned flow capacity very small, the reset rate is relatively slow and the rate time is relatively long, and the controller is then adapted for use in controlling processes with lags as long as five minutes, or longer. When said throttling valve is adjusted to make the last mentioned flow capacity relatively large, the reset rate is relatively fast and the rate time is relatively short and the controller is adapted for use in controlling processes in which the lags are as short as a few seconds. The adjustment of the valve into intermediate

2 positions adapts the controller for use in controlling processes with moderate lags intermediate the long and short lags above mentioned.

The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described preferred embodiments of the invention.

Figure 2:
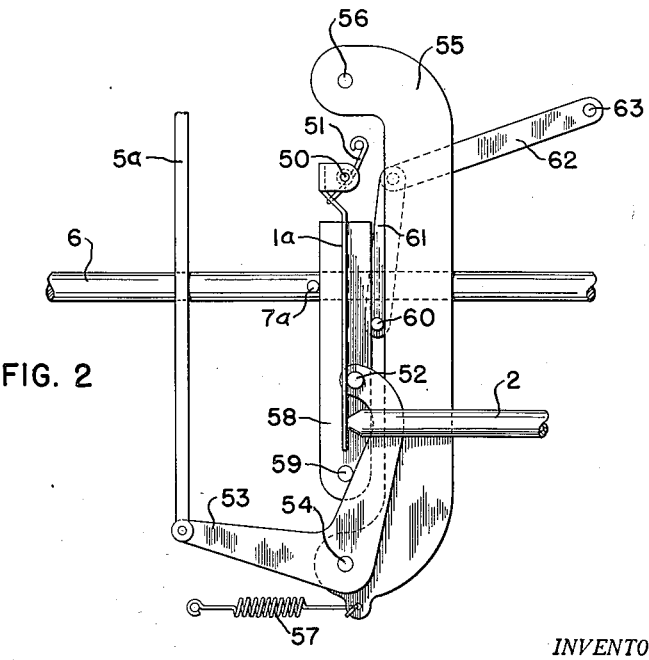

Of the drawings:

Fig. 1 is a somewhat diagrammatic view illustrating a preferred form of the present invention; and Fig. 2 illustrates a modification of a portion of the apparatus shown in Fig. 1.

The air controller unit illustrated by way of example in Fig. 1, comprises a flapper valve or baffle 1, movable toward and away from the orifice end of a nozzle 2. The latter receives air through a restricted passage 3 from a pipe 4 supplying air at a suitable and substantially constant pressure which ordinarily may be of the order of seventeen pounds per square inch. The slight movements of the valve 1 toward and away from the discharge or bleed orifice in the adjacent end of the nozzle 2 subject the latter to variable throttling effects by which the pressure in the nozzle 2 may be varied between a minimum value of a pound or so above the pressure of the atmosphere and a maximum value but little lower than the pressure in the supply pipe 4. The position of the flapper 1 relative to the nozzle 2 is jointly controlled by an element 5 given longitudinal movements in accordance with variations in the control variable, and a throttling element 6 in the form of a rod given movements in the direction of its length as a result of variations in the controlled variable, as is hereinafter explained. As diagrammatically shown in Fig. 1, the valve 1 is suspended from the pivot 7, and is pivotally connected at a point 8 intermediate its ends to the element 5. The latter is a link arranged to move in a direction generally parallel to the line of movement of the rod 6 on changes in the value of the controlled variable.

The variable nozzle pressure is transmitted by a conduit 9 from the nozzle 2 to a pilot valve 10 which receives air from the pipe 4 through a pipe 11. The pilot valve 10 operates to modify the pressure of the air received from the pipe 4 as required to maintain a pressure in its outlet pipe 12 which is in predetermined proportion with the nozzle pressure transmitted to the pilot valve through the pipe 9. The pilot valve 10 may be of any usual or suitable type and form, such for example as the type shown in the Moore Patent 2,125,081. The output pressure is transmitted through the pipe 12 from the pilot valve 10 to a fluid pressure actuated regulator 13 which constitutes the final control element of the apparatus shown in Fig. 1. The pilot valve output pressure is also transmitted by the pipe 12 and a branch pipe 12' to a controller chamber 14 having rigid and movable wall portions.

The rigid wall portions of the chamber 14 comprises a cut shaped casing element 15 and the annular outer portion of a plate-like wall 16 which extends across the open end of the casing 15 and is formed with a central operature 16'. The movable wall portion of the chamber 14 is shown as formed by a bellows element 17 comprising a corrugated tubular body coaxial with, but smaller in diameter than the casing 16 and surrounded by the latter. One end of said tubular body is connected to the stationary end wall 16, and its other end is connected to and closed by a movable bellows end wall member 18. A second bellows element 19, similar in form to the bellows element 17, but shorter and smaller in diameter than the element 17, and coaxial with the latter, is arranged within the space surrounded by the bellows element 17. The tubular body of the element 19 has one end connected to the casing end wall 16 and has its other end connected to, and closed by a movable end wall 20.

The inter-bellows space 21 between the bellows elements 17 and 19 forms an air chamber which is connected to the atmosphere through a flow restriction device 22 and in which the air pressure equals, exceeds, or is less than the pressure of the atmosphere, depending on operating conditions. Advantageously, the flow passage through the device 22 communicates with the atmosphere through a filter 23 operative to prevent dirt from being sucked through the restriction 22 when the pressure in the chamber 21 falls below the pressure of the atmosphere.

The rod 6 is coaxial with the bellows elements 17 and 19 and has one end portion extending through the central opening 16' in the casing wall 16 attached to the movable end wall 20 of the inter-bellows element 19. The opposite end of the rod 6 extends into and is axially disposed in a cup shaped casing 25 surrounding an air chamber 24. The latter has a movable wall comprising a bellows element 27 which may be a counterpart of the bellows element 17. One end of the tubular body of the element 27 is secured to the casing end wall 26. The latter faces and is spaced away from the casing end wall 16, and is formed with a central opening 26' in register with the opening 16' in the wall 16. The second end of the tubular body of the bellows element 27 is connected to a movable end wall 28 and is attached to the adjacent end of the rod 6. The corrugated, tubular bodies of the bellows elements 17, 19 and 27 are ordinarily formed of thin flexible resilient metal.

The rod 6, and thereby the movable end walls 21 and 28 of the bellows elements 19 and 27 are spring biased to normal, intermediate positions. The bias force may be due wholly or in part to the natural resiliency of the bellows elements 19 and 27, but ordinarily is largely due to the action of bias springs 29 and 30. As shown, each of the bias springs 29 and 30 is a helical compression spring surrounding the rod 6. The spring 29 acts between the casing end wall 16 and an abutment 31 carried by the rod 6. As shown, the abutment 31 is in the form of a collar or flange on the rod 6 spaced a short distance away from the bellows end wall 20. The spring 30 acts between the casing end wall 26 and an abutment collar or flange 32 carried by the rod 6 and spaced away from the bellows end wall 28. The chamber 24 is in communication with the atmosphere through a restricted passage in a regulable restriction device, which ordinarily, and as shown, is a needle valve 33. The needle valve 33 may communicate with the atmosphere through the previously mentioned filter 23.

As shown by way of example in Fig. 1, the controlled variable, which by its variations gives movements to the member 5, is a temperature to which the bulb of a fluid pressure thermometer 35 is subjected. In the arrangement diagrammatically shown in Fig. 1, the thermometer bulb pressure is transmitted by a pipe 36 to the outer stationary end 37 of a spiral Bourdon tube 38. The latter has its movable inner end 39 secured to a pen arm or analogous deflecting element 40 mounted on a supporting pivot 41 adjacent a point at which the Bourdon tube 39 is connected to the element 40. As diagrammatically shown, the deflecting element 40 is generally parallel to the flapper 1, and the element 5 is a link having one end pivotally connected to the flapper 1 at the point 8, and having its other end pivotally connected to the deflecting element 40 at the point 42. The temperature measured by the thermometer 35, may well be the temperature of a furnace heated by the combustion of fluid fuel supplied to the furnace at a rate determined by the pilot valve pressure transmitted to the regulator 13, which then serves as the fuel supply valve for the furnace.

In the normal contemplated operation of the particular form of apparatus shown in Fig. 1, a decrease in the temperature to which the thermometer 35 responds, effects a counter-clockwise adjustment of the deflecting element 40 and thereby effects a counter-clockwise adjustment of the flapper valve 1. That valve adjustment increases the throttling effect of the valve on the outflow of air through the nozzle 2 and thereby increases the nozzle air pressure. That pressure increase is transmitted by the pipe 9 to the pilot valve 10 and correspondingly increases the pilot valve output pressure. The output pressure increase is transmitted to the regulator 13 and gives the latter an opening adjustment which increases the rate at which fuel is supplied by the regulator and thus tends to restore the predetermined or normal value of the furnace temperature measured by the thermometer 35.

The increase in the pilot valve output pressure is also transmitted to the control pressure chamber 14 and thereby partially collapses or shortens the throttling bellows element 17. As the bellows element 17 is thus shortened, the air in the inter-bellows space 21 is compressed and its pressure subjects the inner-bellows element 19 to a slight collapsing action. In consequence, the rod 6 is immediately displaced to the right, and, through the pin 7, immediately gives a slight initial follow-up adjustment to the flapper valve 1. That adjustment decreases the throttling effect of the valve and eliminates a small portion of the nozzle pressure increase produced by the preceding counter-clockwise adjustment of the deflecting element 40. The rate of fuel flow through the regulator 13 and the control pressure in the chamber 14 are reduced by the initial follow-up action, and they are further reduced by the subsequent or final follow-up action hereinafter described. The extent of the initial follow-up action is dependent on the volume of the chamber 24, and its magnitude is determined by the increase in the pressure in the chamber 24 required to make the net force acting on the rod 6 and tending to move the latter to the left, equal in magnitude to the net force acting on the left hand of the rod and tending to move the latter to the right. The initial follow-up action raises the pressure in the chamber 24 above the pressure of the atmosphere and thus results in a flow of air past the needle valve 33 out of the chamber 24 and into the atmosphere.

The escape of air from the chamber 24 slightly reduces the pressure in the chamber 24, but is attended by a further slow final follow-up movement of the rod 6 to the right which keeps the pressure in the chamber 24 above atmospheric pressure until that follow-up movement is completed. That movement continues until the resultant of forces acting on the rod 6 in the direction of its length is equalized. As the rod moves slowly to the right it progressively displaces the valve I from the nozzle 2, unless its action on the valve is neutralized by a further decrease in the temperature measured by the thermometer 35. The described retardation of the follow-up is a rate action which permits a temporary opening of the valve 13 of greater average extent than would exist if the follow-up action were not retarded. During the period in which the follow-up movement of the rod 6 to the right continues, the pressure in the chamber 24 is necessarily higher than the pressure of the atmosphere, and results in a continuous outflow of air from said chamber through the restriction 33. However, the expulsion of air from the chamber 24 as the rod 6 is moved to the right has no effect of substantial significance on the rate time, i. e., the time required to complete the follow-up action.

When the forces acting in opposite directions on the rod 6 are brought into balance at the end of the complete follow-up action resulting from a furnace temperature decrease and movement of the element 5 to the right, the rod 6 is at the right of its normal position. In consequence, the bellows elements 19 and 27 and springs 29 and 30 subject the rod 6 to a resultant spring bias force tending to move the rod to the left. At the instant at which the follow-up movement terminates, said bias force is balanced by the resultant of the fluid pressure forces acting against the movable ends of the bellows elements 19 and 27. The last mentioned resultant is then diminishing, however, as a result of the expulsion of air from the chamber 21 past the restriction 22, and following the completion of its follow-up movement is given a reset movement to the left. During that reset movement, the volume of the air space in the chamber 21 diminishes and the air pressure in the chamber 21 remains above the pressure of the atmosphere, while the volume of the air space in the chamber 24 increases and the pressure in that chamber falls below the pressure of the atmosphere. The reset rate of movement of the rod 6 is thus jointly dependent on the rate at which air is expelled from the chamber 21 past the restriction 22, and on the rate at which atmospheric air is drawn into the chamber 24 past the needle valve 33.

The foregoing explanation of the follow-up and reset actions of the apparatus shown in Fig. 1 are consistent with the assumption that they follow and result from some change in the furnace load which lowers the furnace temperature maintained with a given rate of fuel supply to the furnace. On that assumption, the effect of the reset operation is to progressively increase the throttling action of the valve I on the outlet from the nozzle 2, so that the pilot valve output pressure progressively increases during the reset operation. The corresponding increase in the rate at which the regulator 13 supplies fuel, gradually increases the furnace temperature and if the controller and fuel regulator are properly proportioned and calibrated, the furnace temperature will be returned to its normal value during the reset operation, and will remain at its normal value until the furnace temperature is again disturbed by some further change in furnace operating conditions.

As those skilled in the art will understand, the normal temperature which the control apparatus tends to maintain is not absolutely constant, but necessarily varies slightly to provide different fuel supply rates under different operating conditions. However, the apparatus shown in Fig. 1 may readily be designed in accordance with the knowledge and practice of the art so that the total net change in the furnace temperature required to effect the adjustment of the regulating valve 13 from its wide open to its fully closed position will be of the order of ½° F.

The maintenance of different rates of fuel supply during respectively different stable operation periods, requires a displacement of the valve I from the nozzle 2 to predeterminable different positions in the different periods. However, the maximum range of valve displacement required to vary the control pressure between its minimum and maximum values, while definite, is quite small. In ordinary practice, it is of the order of from two to four thousandths of an inch. If, for any reason, the furnace temperature is not restored to its normal value during a normal reset operation, the displacement of the valve I from the nozzle 2 at the end of the operation will not give the control pressure required to supply fuel at the rate needed to maintain the normal temperature under the existing condition of operation. In such case, one or more subsequent follow-up and reset operation may be necessary to establish and stabilize the control pressure needed.

With stable operating conditions, at the end of the reset operation the air pressure in each of the chambers 21 and 24 will be equal to the pressure of the atmosphere, and the bias spring action on the rod 6 will hold the latter in its normal position. The position of the movable end 18 of the bellows element 17 will then depend on the extent to which the control pressure in the chamber 14 exceeds the pressure of the atmosphere. The resultant of the forces acting on the bellows 17 which are due to the pressure in the chamber 14 and to the atmospheric pressure in the chamber 21, will then be balanced by the force with which the resiliency of the bellows element 17 opposes the further contraction or shortening of that element. It will be observed that with the bellows end wall 28 substantially larger than the bellows end wall 20, the required pressure variations in the chamber 24 are desirably smaller than are the pressure variations required in the chamber 21.

An increase of the furnace temperature following a period of stable operation in which said temperature is at its normal value, results in control operations which are the converse of those described above as resulting from a decrease in said temperature. Thus, during the follow-up action resulting from an increase in the furnace temperature, the rod 6 moves to the left in consequence of the fact that the pressure in the chamber 24, while then below the pressure of the atmosphere, is in excess of that required to make its thrust against the end wall 18 exceed the thrust of the pressure in the chamber 21 against the smaller bellows end wall 20. The rate time required for the completion of the follow-up action is thus essentially a function of the flow restricting effect of the needle valve 33 which controls the inflow of air into the chamber 24 and thereby controls the pressure maintained in the chamber as the follow-up movement to the left of the rod 6 is being completed. The reset rate with which the rod 6 thereafter moves toward the right back into its normal position, is a joint function of the flow restricting actions of the restriction device 22 and throttling valve 33. During the reset movement to the right of the rod 6 the pressure in the chamber 21 remains below the pressure of the atmosphere, and atmospheric air is slowly drawn into that chamber. During this reset operation, however, the pressure in the chamber 24 exceeds the pressure of the atmosphere, and air is expelled from the chamber through the needle valve 33.

Thus, during the delayed follow-up movement of the rod 6 in either direction, the valve 33 acts as a rate response element and its adjustment determines the rate time of the air controller. However, in the reset action which follows the termination of a follow-up action, the reset rate is a joint function of the flow restricting effects of the restriction 22 and the flow restricting needle valve 33, and may be increased or decreased by adjusting the valve 33 to decrease or increase its throttling effect. The fact that both the rate time and the reset rate may be adjusted by the adjustment of a single valve, avoids the necessity for simultaneously adjusting separate rate response and reset valves, as has been found desirable in control apparatus containing such separate valves.

With the flapper valve 1 suspended from the pivot 7 of the follow-up rod 6, as shown in Fig. 1, the magnitude of the follow-up action which results from a given change in the furnace temperature, cannot be adjusted. Such adjustment is desirable in some cases, and may be obtained by the use of provisions through which the adjustment of the flapper valve, effected by a given longitudinal movement of the rod 6, may be varied. For example, use may be made of the well known arrangement for effecting such adjustments, which is shown in Fig. 2. In that figure, the flapper valve 1a is suspended from a stationary pivot 50 and is biased by a spring 51 for turning movement toward the bleed nozzle 2. The flapper valve 1a may be displaced, more or less, from the orifice end of the nozzle 2 by the adjustment of a pin 52. The latter is carried by one arm of a lever 53 which has a second arm connected to a control element 5a. That element may be actuated in response to variations in a control quantity, just as is the element 5 of Fig. 1. The lever 53 is mounted on a movable fulcrum pivot 54 below the pin 52 and carried by the lower end of the lever 55. The latter is suspended from a stationary pivot 56 above the pin 52 and above the rod 6. The lever 55 is biased as by a spring 57 for movement in the direction to cause the pin 52 to move the valve 1a away from the nozzle 2.

The angular position of the lever 55 is maintained in a fixed but adjustable relation with the longitudinal position of the follow-up rod 6 by means comprising a pin 7a carried by the rod 6, a vertically disposed lever 58 and a thrust pin 60. The lower end of the lever 58 is mounted on a stationary pivot pin 59 adjacent the orifice end of the nozzle 2. The lever 58 is alongside the lever 55 and acts on the latter through the thrust pin 60. The latter is transverse to the levers 55 and 58 and is vertically adjustable to vary the leverage with which the lever 58 acts on the lever 55. Thus the effect of raising and lowering the pin 60 is to respectively increase and decrease the horizontal component of the movement given the pin 52 by a given longitudinal adjustment of the rod 6. In consequence, the raising and lowering of the pin 60 respectively increases and decreases the throttling range of the air controller. As shown, the pin 60 is suspended by a link 61 from a throttling range adjusting lever 62, which may be angularly adjusted about its supporting pivot 63. The throttle range or proportional band adjusting means shown in Fig. 2 are of the general type and form shown in the above-mentioned Moore Patent 2,125,081.

The arrangement of the bellows elements 17, 19 and 27, shown in Fig. 1, contribute to compactness and structural simplicity of the controller unit, and the use of bellows elements 17 and 27 of substantially the same diameter along with a bellows element 19 of substantially smaller diameter, facilitates the maintenance of suitably related pressures in the air chambers 14, 21 and 24. The use of air under pressure in effecting reset response has advantages over the customary use of liquid. The use of air avoids the leakage difficulty and difficulties due to the thermal expansion and contraction of liquid, experienced when liquid under pressure is used for reset operations. The use of air as provided for herein also permits proportional, reset and rate responses with apparatus at least as compact and simple as the apparatus including liquid filled chambers heretofore generally used in obtaining proportional and reset responses without obtaining rate responses.

While in accordance with the provisions of the statutes, I have illustrated and described the best forms of embodiment of my invention now known to me, it will be apparent to those skilled in the art that changes may be made in the forms of the apparatus disclosed without departing from the spirit of my invention, as set forth in the appended claims, and that in some cases certain features of my invention may be used to advantage without a corresponding use of other features.

Having now described my invention, what I claim as new and desire to secure by Letters Patent, is:

1. An air controller unit comprising first and second expansible air chambers each having walls including a movable wall biased to a predetermined position and having a restricted passage through which each of said chambers is in restricted communication with the atmosphere, a movable mechanical connection between said movable walls and actuated by the expansion of either chamber to contract the other chamber, said first chamber having a second movable wall, means for maintaining a control pressure comprising a bleed nozzle and a throttling valve movable to vary the pressure in said nozzle, means for subjecting the outer side of said second movable wall of said first chamber to a force proportional to said control pressure, and valve adjusting means including an element movable in accordance with variations in a controlled variable and means through which the movements of said mechanical connection give said valve reset adjustments, and retarded follow-up adjustments whereby said controller unit gives proportional, reset and rate control responses on a variation in the value of said controlled variable.

2. An air controller unit as specified in claim 1, including a flow restricting device adjustable to vary the flow capacity of the restricted passage through which said second chamber is in communication with the atmosphere and thereby regulates the rate time of said controller unit.

3. An air controller unit as specified in claim 1, in which the movable chamber walls connected by said mechanical connection are juxtaposed, and in which said connection is a strut extending between said walls.

4. An air controller unit as specified in claim 1, in which the area of the movable wall of said second chamber is substantially greater than the area of the movable wall of the first chamber connected to the movable wall of said second chamber by said mechanical connection.

5. An air controller unit as specified in claim 1, in which the area of the movable wall of said second chamber is substantially greater than the area of the movable wall of the first chamber connected to the movable wall of said second chamber by said mechanical connection, and in which the second movable wall of said first chamber is of substantially larger area than the other movable wall of that chamber.

6. An air controller unit as specified in claim 1, in which each of said movable walls comprises a corrugated tubular bellows element coaxial with the tubular bellows element of each of the other chambers, and in which the bellows element included in the second movable wall of the first chamber is larger than, and surrounds the tubular bellows element included in the other movable wall of the first chamber, and including stationary means to which one end of each bellows element is connected, and a separate movable end wall connected to the second end of each bellows element.

DONALD P. ECKMAN.

REFERENCES CITED

The following references are of record in the file of this patent:

UNITED STATES PATENTS

| Number | Name | Date |
|---|---|---|
| 1,680,750 | Smoot | Aug. 14, 1928 |
| 2,117,800 | Harrison | May 17, 1938 |
| 2,149,390 | Donaldson | Mar. 7, 1939 |